US010496810B2

(12) United States Patent
Lewis et al.

(10) Patent No.: US 10,496,810 B2
(45) Date of Patent: Dec. 3, 2019

(54) METHODS AND SYSTEMS OF PERFORMING PREEMPTIVE GENERATION OF SECOND FACTOR AUTHENTICATION

(71) Applicant: GOOGLE LLC, Mountain View, CA (US)

(72) Inventors: Justin Lewis, Marina Del Ray, CA (US); Thomas Price, San Francisco, CA (US)

(73) Assignee: Google LLC, Mountain View, CA (US)

( * ) Notice: Subject to any disclaimer, the term of this patent is extended or adjusted under 35 U.S.C. 154(b) by 112 days.

(21) Appl. No.: 15/715,815

(22) Filed: Sep. 26, 2017

(65) Prior Publication Data

US 2019/0095606 A1 Mar. 28, 2019

(51) Int. Cl.
G06F 21/00 (2013.01)
G06F 21/41 (2013.01)
H04L 29/06 (2006.01)
G06F 21/40 (2013.01)

(52) U.S. Cl.
CPC .......... G06F 21/41 (2013.01); G06F 21/40 (2013.01); H04L 63/0815 (2013.01); H04L 63/0884 (2013.01); H04L 63/108 (2013.01); H04L 2463/082 (2013.01)

(58) Field of Classification Search
None
See application file for complete search history.

(56) References Cited

U.S. PATENT DOCUMENTS

| 7,412,420 B2 * | 8/2008 | Holdsworth | G06F 21/34 235/380 |
| 10,206,099 B1 * | 2/2019 | Trinh | H04W 12/06 |
| 2002/0004935 A1 * | 1/2002 | Huotari | H04L 12/12 717/170 |

(Continued)

FOREIGN PATENT DOCUMENTS

| EP | 3093786 A1 | 11/2016 |
| EP | 3179397 A1 | 6/2017 |
| WO | 2013049392 A1 | 4/2013 |

OTHER PUBLICATIONS

International Search Report and Written Opinion for Application No. PCT/US2018/044991, dated Oct. 2, 2018. 14 pages.

*Primary Examiner* — Maung T Lwin
(74) *Attorney, Agent, or Firm* — Lerner, David, Littenberg, Krumholz & Mentlik, LLP

(57) ABSTRACT

A method includes prompting, by a first application installed on a client electronic device, a user to install a second application on the client electronic device, and prompting, by the first application, the user to authorize preemptive sign-in to the second application. In response to receiving an indication from the user to install the second application and receiving an indication from the user to authorize preemptive sign-in to the second application, the second application is installed, and a two-factor authentication code that authorizes the user to sign into the second application is generated. The method includes sending a message to the second application, launching the second application, and automatically signing the user into the second application without requiring the user to provide the two-factor authentication code or any other form of second-factor authentication.

20 Claims, 9 Drawing Sheets

(56) References Cited

U.S. PATENT DOCUMENTS

| | | | |
|---|---|---|---|
| 2006/0288405 A1* | 12/2006 | Albisu | G06F 21/34 726/8 |
| 2008/0189776 A1* | 8/2008 | Constable | G06F 21/32 726/7 |
| 2009/0222925 A1* | 9/2009 | Hilaiel | G06F 21/53 726/25 |
| 2009/0249078 A1* | 10/2009 | Kim | H04L 63/0815 713/185 |
| 2010/0024015 A1* | 1/2010 | Hardt | H04L 67/14 726/6 |
| 2010/0077467 A1 | 3/2010 | Satagopan et al. | |
| 2011/0016320 A1* | 1/2011 | Bergsten | H04L 63/08 713/170 |
| 2013/0031623 A1* | 1/2013 | Sanders | G06F 21/34 726/19 |
| 2013/0086670 A1* | 4/2013 | Vangpat | H04L 9/3213 726/8 |
| 2016/0217280 A1* | 7/2016 | Oberheide | H04L 63/08 |
| 2016/0269396 A1* | 9/2016 | Ren | H04W 12/06 |
| 2016/0294806 A1* | 10/2016 | Du | H04L 63/08 |
| 2017/0093835 A1* | 3/2017 | Whiteside | G06F 21/335 |

\* cited by examiner

METHODS AND SYSTEMS OF PERFORMING PREEMPTIVE GENERATION OF SECOND FACTOR AUTHENTICATION

BACKGROUND

Many services that run on or are otherwise accessible by electronic devices require users to input a two-factor authentication (2FA) code or other second-factor authentication token.

Two-factor authentication is a security feature that requires a user to provide a 2FA code or token in addition to single-factor authentication credentials, such as, for example, a username and password, in order to access a resource. Two-factor authentication may be used in certain situations such as when a user attempts to access a resource from a new device, on a new device, from an unknown Internet Protocol address, or in an otherwise unknown environment.

In these situations, a 2FA code is sent to the user in a secure manner. For example, a 2FA code may be sent to the user in a text message or in an email message to an email account that has been verified as belonging to the user. The user is then required to provide the 2FA code to access the associated resource.

Currently, many software applications that run on electronic devices promote the use of other applications. The promoted applications may be ones related to the promoting application, or ones provided by a same service provider as the promoting application. However, users are often required to go through the 2FA process to access even promoted applications. 2FA workflows can be burdensome for users, and services often lose a significant number of users who don't sign into a promoted application after installation because the process of fetching and entering a 2FA code is too difficult and time intensive.

SUMMARY

This document describes methods and systems for preemptively triggering the generation of a second form of authentication in parallel with triggering the installation of an application. A single prompt allows users to install and authorize sign-in to a second application on a client electronic device from a first application in a single step. The installation and generation of the code happen in parallel, and when the second application is launched, the user is not required to enter a 2FA code. Rather, the code or other confirmation of second-factor authentication has already been transmitted to the second application.

In an embodiment, a method includes prompting, by a first application installed on a client electronic device, a user to install a second application on the client electronic device, and prompting, by the first application, the user to authorize preemptive sign-in to the second application. The method includes, in response to receiving an indication from the user to install the second application and receiving an indication from the user to authorize preemptive sign-in to the second application: installing, by the client electronic device, the second application, and generating a two-factor authentication code that authorizes the user to sign into the second application. The method includes sending, by the client electronic device, a message to the second application, where the message comprises the two-factor authentication code that authorizes sign-in to the second application by the user, launching the second application, and automatically signing the user into the second application without requiring the user to provide the two-factor authentication code or any other form of second-factor authentication.

Optionally, generating the two-factor authentication code may include using a private key associated with the first application to generate the two-factor authentication code.

Sending the message to the electronic device associated with the second application may include embedding the two-factor authentication code in the message. Embedding the two-factor authentication code in the message may include embedding the two-factor authentication code in a marketing tag of the message.

In an embodiment, the method may further include encrypting, by the first application, at least a portion of the message using a private key associated with the first application. The method may include sending, by the second application, the at least a portion of the message to the sign-in server, and receiving, by the second application, an indication from the sign-in server that the two-factor authentication code is valid.

Automatically signing the user into the second application without requiring the user to provide an additional form of authentication may include automatically signing the user into the second application in the absence of an Internet connection.

The method may further include obtaining one or more access credentials associated with the user to access the second application, where the one or more access credentials do not comprise the two-factor authentication code or other form of second-factor authentication.

In an embodiment, a method may include prompting, by a first application installed on a client electronic device, a user to install a second application on the client electronic device, and prompting, by the first application, the user to authorize preemptive sign-in to the second application. The method may include, in response to receiving an indication from the user to install the second application and receiving an indication from the user to authorize preemptive sign-in to the second application: installing, by the client electronic device, the second application, generating, by the first application, a message comprising an indication that the user has authorized sign in to the second application, and sending, by the client electronic device, the message to a sign-in server. The method may include launching the second application, and automatically signing the user into the second application without requiring the user to provide a two-factor authentication code or any other form of second-factor authentication.

Optionally, the method may include encrypting, by the first application, at least a portion of the message using a private key associated with the first application. The indication that the user has authorized sign in to the second application is associated with one or more of the following: a time period during which the indication is valid, a number of uses for which the indication is valid, or an indication of an application for which sign-on is valid.

In an embodiment, a system may include a client electronic device, where a first application is installed on the client electronic device, and a computer-readable storage medium. The computer-readable storage medium may include one or more programming instructions that, when executed, cause the client electronic device to: prompt a user to install a second application on the client electronic device, prompt the user to authorize preemptive sign-in to the second application, in response to receiving an indication from the user to install the second application and receiving an indication from the user to authorize preemptive sign-in to the second application: install the second application, and generate a two-factor authentication code that authorizes the user to sign into the second application, send a message to the second application, where the message comprises the two-factor authentication code that authorizes sign-in to the second application by the user, launch the second application, and automatically sign the user into the second application without requiring the user to provide the two-factor authentication code or any other form of second-factor authentication.

Optionally, the one or more programming instructions that, when executed, cause the client electronic device to generate the two-factor authentication code may include one or more programming instructions that, when executed, cause the client electronic device to use a private key associated with the first application to generate the two-factor authentication code.

The one or more programming instructions that, when executed, cause the client electronic device to send the message to the electronic device associated with the second application may include one or more programming instructions that, when executed, cause the client electronic device to embed the two-factor authentication code in the message.

The one or more programming instructions that, when executed, cause the client electronic device to embed the two-factor authentication code in the message may include one or more programming instructions that, when executed, cause the client electronic device to embed the two-factor authentication code in a marketing tag of the message.

Optionally, the computer-readable storage medium may further include one or more programming instructions that, when executed, cause the client electronic device to encrypt at least a portion of the message using a private key associated with the first application.

The second application may configured to: send the at least a portion of the message to the sign-in server; and receive an indication from the sign-in server that the two-factor authentication code is valid.

In an embodiment, a system includes a client electronic device, where a first application is installed on the client electronic device, and a computer-readable storage medium. The computer-readable storage medium includes one or more programming instructions that, when executed, cause the client electronic device to: prompt a user to install a second application on the client electronic device, prompt the user to authorize preemptive sign-in to the second application, in response to receiving an indication from the user to install the second application and receiving an indication from the user to authorize preemptive sign-in to the second application: install the second application, generate a message comprising an indication that the user has authorized sign in to the second application, and send the message to a sign-in server, launch the second application, and automatically sign the user into the second application without requiring the user to provide a two-factor authentication code or any other form of second-factor authentication.

The computer-readable storage medium may further include one or more programming instructions that, when executed, cause the client electronic device to encrypt at least a portion of the message using a private key associated with the first application.

The indication that the user has authorized sign in to the second application is associated with one or more of the following: a time period during which the indication is valid; a number of uses for which the indication is valid; or an indication of an application for which sign-on is valid.

DETAILED DESCRIPTION

Figure 1:
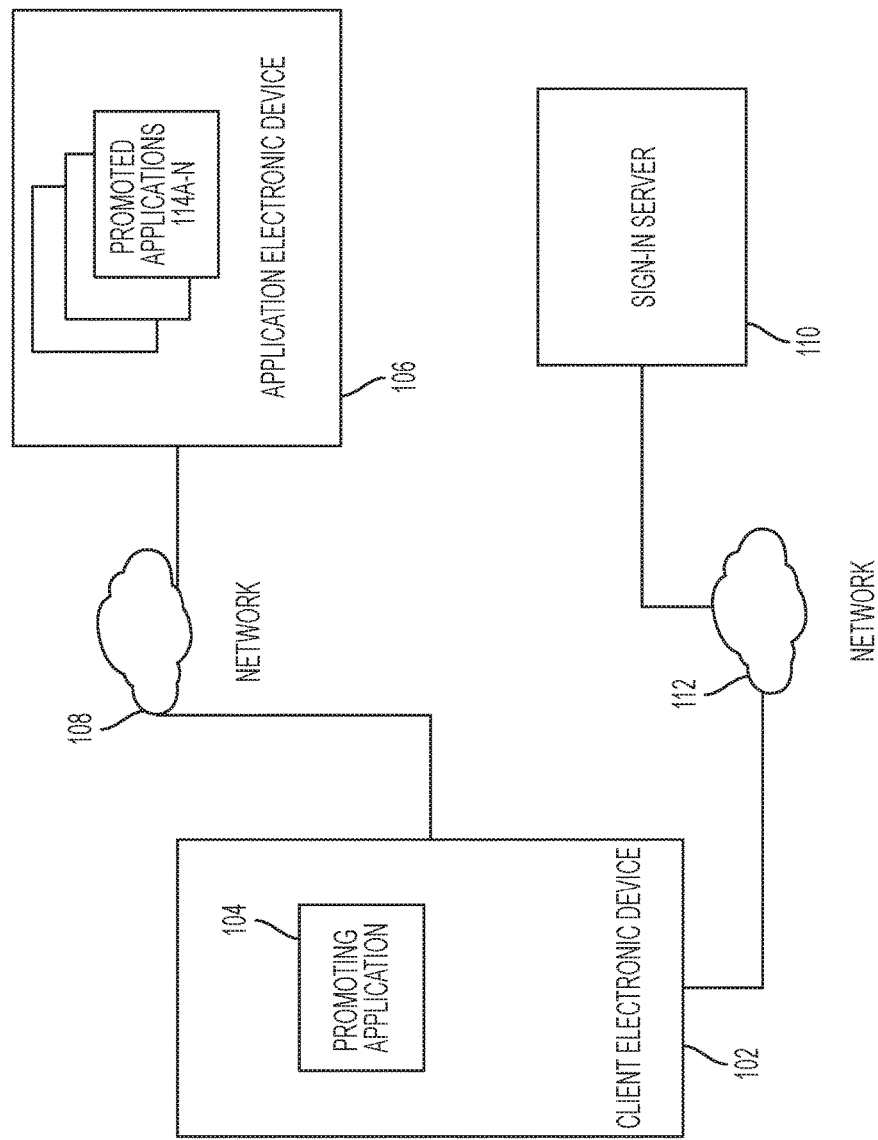
FIG. 1 illustrates an example system for generating a second form of authentication according to an embodiment.

Terminology that is relevant to this disclosure includes:

The singular forms "a," "an," and "the" include plural references unless the context clearly dictates otherwise. Also, the term "comprising" (or "comprise") means "including (or include), but not limited to." The relative terms "long" and "short" are intended to be relative measurements with respect to each other, in that the measurement value of an item that is designated as "long" will be relatively longer than the measurement value of a corresponding item that is designated as "short." Unless defined otherwise, all technical and scientific terms used in this document have the same meanings as commonly understood by one of ordinary skill in the art.

An "application" refers to a program configured to instruct a client device to perform one or more tasks.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers (such as those used in hosted services), mainframes, virtual machines, containers, gaming systems, televisions, and mobile electronic devices such as smartphones, personal digital assistants, cameras, tablet computers, laptop computers, media players and the like. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as sections within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices collectively perform a process.

FIG. 1 illustrates an example system for generating a second form of authentication according to an embodiment. As illustrated by FIG. 1, the system 100 includes a client electronic device 102. A client electronic device 102 may be a smartphone, a wearable (such as, for example, a smartwatch), a tablet and/or any other electronic device via which a user may access a locally installed application or remote service. As shown in FIG. 1, a client electronic device 102 may have a first application 104 installed on the client electronic device. For purposes of this document, this application 104 is referred to throughout as the "promoting application." The promoting application 104 may recommend or prompt a user to install one or more other applications, which are referred to in this disclosure as "promoted applications."

As illustrated in FIG. 1, a client electronic device 102 is in communication with an application electronic device 106. An application electronic device may store and/or host one or more promoted applications 114a-N. A client electronic device 102 communicates with an application electronic device via one or more communication networks 108. A client electronic device 102 may be in communication with a sign-in server 110 via one or more communication networks 112.

Figure 2:
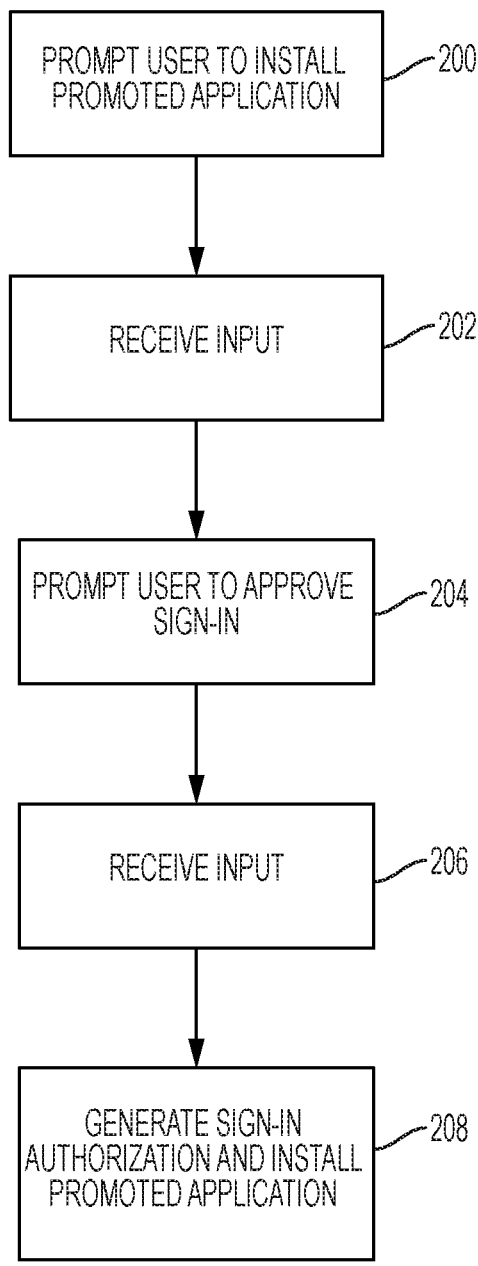
FIG. 2 illustrates an example method of generating a second form of authentication according to an embodiment.

FIG. 2 illustrates an example method of generating a second form of authentication according to an embodiment. As shown in FIG. 2, a promoting application prompts 200 a user to install a promoted application. A promoting application may be installed on a client electronic device, such as for example, a smartphone. The promoting application may prompt 200 a user to install a promoted application on the client electronic device. Optionally, the promoted application may be an application that is related to promoting application. For example, the promoted application may be an application that is provided by a same service provider as the promoting application. Alternatively, the promoted application may be an application that the promoting application recommends based on the user's usage of the promoting application.

Figure 3:
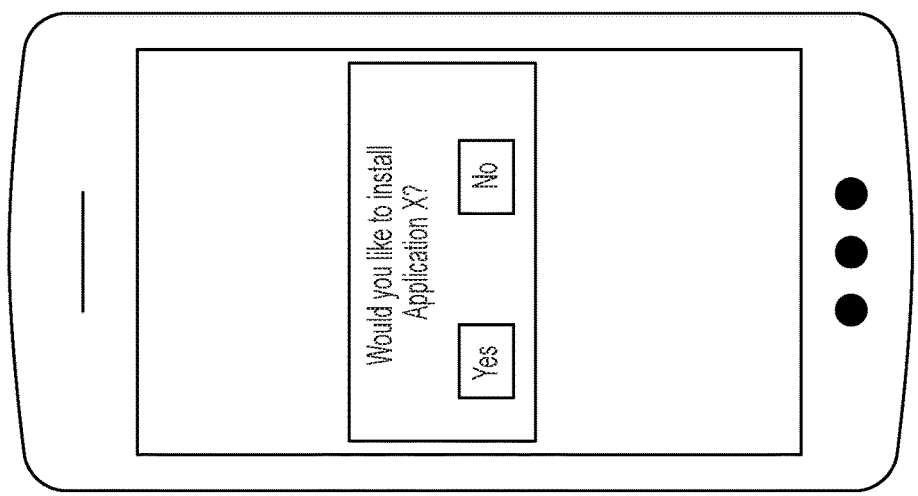
FIGS. 3, 4A and 4B illustrate example prompts according to various embodiments.

A promoting application prompts 200 a user to install a promoted application by causing an interface to be displayed. The interface may ask the user to confirm whether the user would like to install the promoted application. FIG. 3 illustrates an example prompt according to an embodiment.

The client electronic device receives 202 input from the user indicating whether the user would like to install the promoted application. The input may be provided via a touchscreen of the client electronic device, via a keyboard, a mouse, a stylus, or other input device, or via one or more spoken instructions or commands.

Figure 4A:
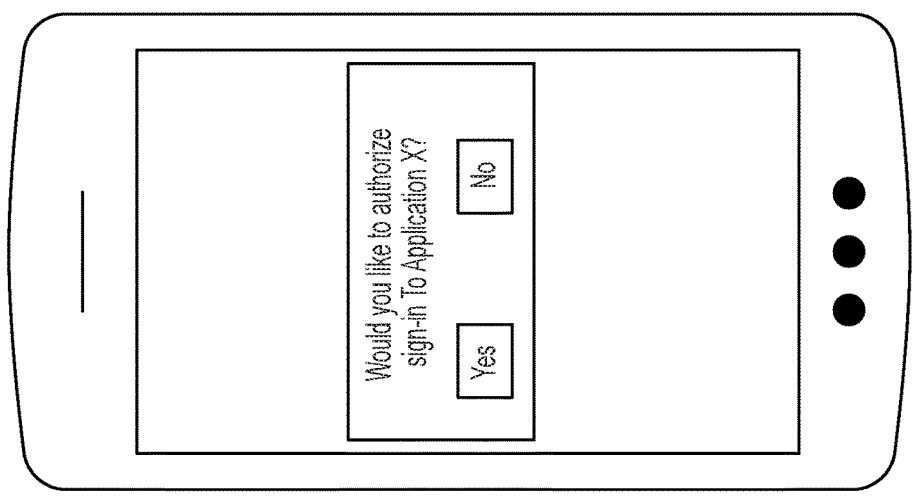
Figure 4B:
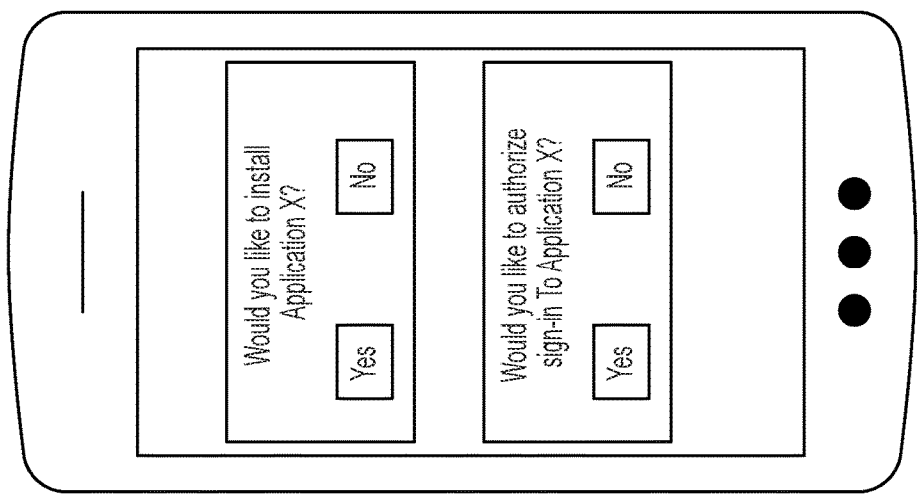

In response to receiving input indicating that the user would like to install the promoted application, the promoting application prompts 204 the user to preemptively approve sign-in to the promoted application. The promoting application may prompt a user to approve sign-in to the promoted application by causing an interface to be displayed. The prompt may be displayed as a separate interface to the installation prompt discussed above, or the prompt may be displayed alongside the installation prompt, as illustrated by FIGS. 4A and 4B. Alternatively, the promoting application may prompt 204 the user to preemptively approve sign-in to the promoted application and install the promoted application in a single prompt. A user may only make one selection (e.g., selecting an icon, pressing a button) to agree to both prompts.

The client electronic device receives 206 input from the user indicating whether the user authorizes sign-in to the promoted application. In response to receiving input from the user indicating that the user would like to install the promoted application and that the user authorizes sign-in to the promoted application, the promoting application generates 208 a sign-in authorization and installs the promoted application in parallel. As such, a user is not required to separately install, sign-in and provide authentication of the sign-in (e.g., via a second factor authorization code) to the promoted application. Instead, the user can authorize installation and sign-in in parallel which creates a more seamless and user-friendly experience. In addition to saving a user time, authorizing installation and sign-in in parallel economizes battery usage by requiring a user to spend less time (and therefore less processing power) to carry out the steps of installing and signing into an application.

Figure 5:
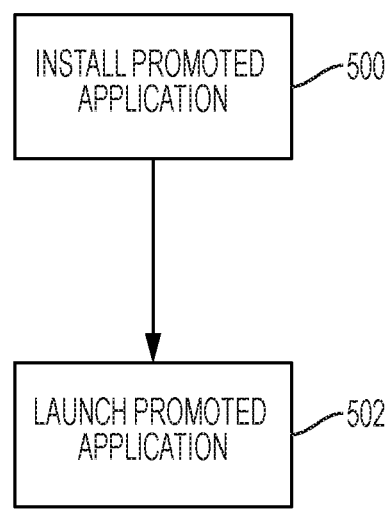
FIG. 5 illustrates an example way of performing generation of a sign-in authorization and installation of a promoted application in parallel according to an embodiment.

FIG. 5 illustrates an example way of performing 208 generation of a sign-in authorization and installation of a promoted application in parallel according to an embodiment. As illustrated by FIG. 5, a promoting application installs 500 a promoted application on a client electronic device. A promoting application may install 500 a promoted application by sending one or more instructions to an application electronic device from which the promoted application is accessible. In response to receiving the instructions, the application electronic device sends the promoted application to the client electronic device, which installs the promoted application. Installation of the promoted application may happen via an in-line installation dialog without the user leaving the promoting application.

As another example, a promoting application may install 500 a promoted application by redirecting a user to a location from where the user can install the promoted application. For instance, a promoting application may redirect a user to a marketplace or store where the user can install the promoted application by selecting an "install" button or similar option.

Once installed, the promoted application is launched 502. The promoted application may be launched 502 automatically by the promoting application. Alternatively, a user may independently launch 502 the promoted application.

Figure 6:
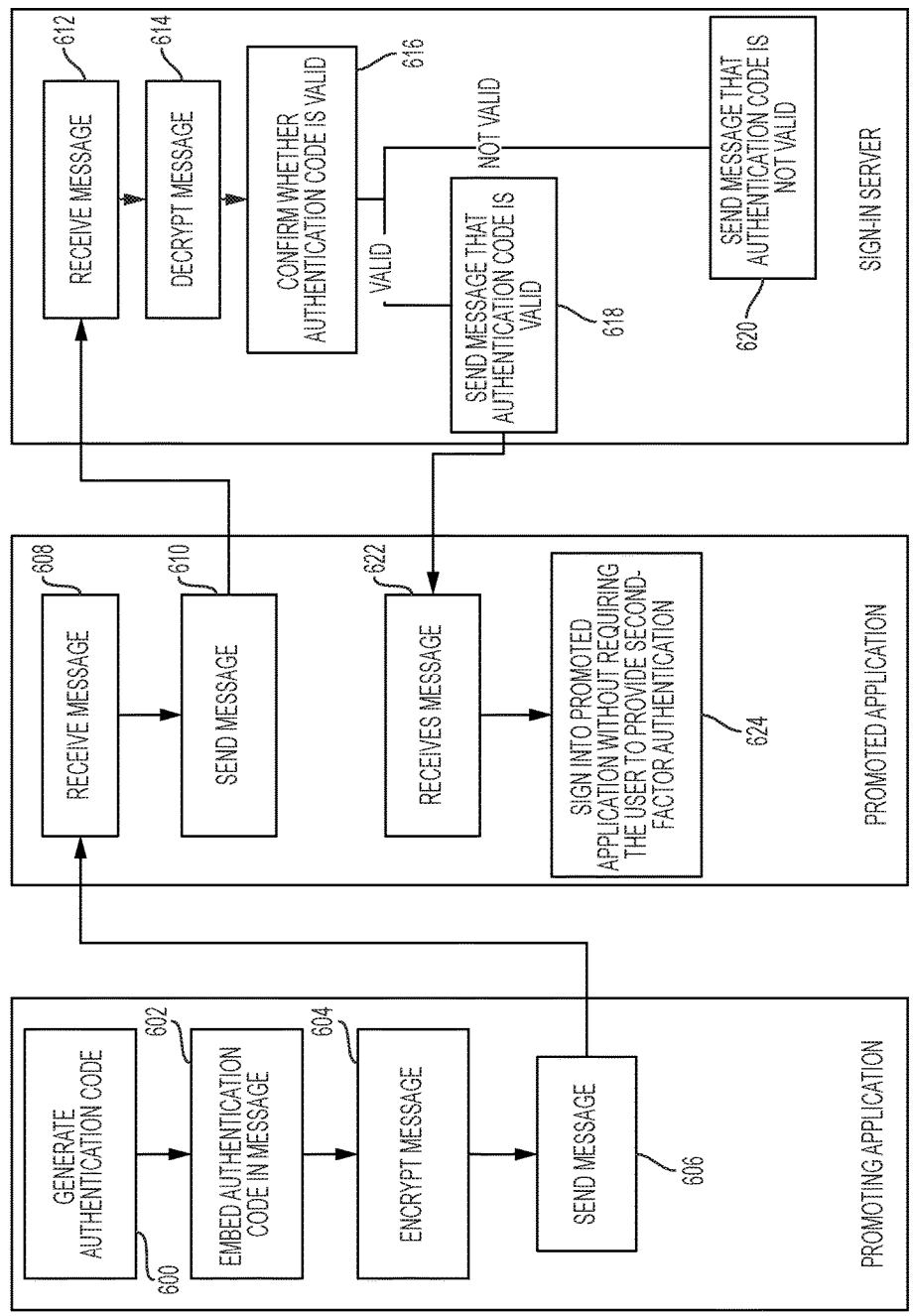
FIGS. 6 and 7 illustrate example methods of launching a promoted application according to various embodiment.

FIG. 6 illustrates an example method of launching 502 a promoted application according to an embodiment. As shown in FIG. 6, a client electronic device may generate 600 an authentication code. An example of an authentication code is a two-factor (or second-factor) authentication (2FA) code. The client electronic device may generate 600 an authentication code using a private key associated with the promoting application and/or the client electronic device. In this way, the authentication code can be verified to have originated with the promoting application and/or the client electronic device.

As an example, a client electronic device may include a code generator application. The code generator application may have a private key. A sign-in server (or other server) may have a private key that is associated with the private key of the client. In various embodiments, both private keys may have been generated by a server during the initiate setup of the code generator application.

A client electronic device may generate an authentication code by combining its private key with other rotating or dynamic data. For example, a client electronic device may retrieve a clock time or a counter associated with the client electronic device. The client electronic device may generate an authentication code that is mathematically derived from its private key and the rotating data.

In various embodiments, a promoting application may embed 602 an authentication code that has been generated in a message. For instance, a promoting application may embed 602 an authentication code in a marketing tag of a message. A marketing tag refers to one or more data-collecting programming instructions that collect certain information. A marketing tag may be embedded in an application, a website and/or the like to facilitate collection of such information. Information that may be collected includes, without limitation, visitor behavior information, information relating to marketing campaigns (e.g., an indication of which promoting application directed the user to the promoted application), and/or information pertaining to web analytics. The information may also include information to launch product functionality, such as, for example the display of certain advertisements. The promoting application may encrypt 604 all or part of the message. For instance, the promoting application may encrypt 604 at least a part of the message using a key unique to the promoting application.

The promoting application sends 606 the message to the promoted application. The promoted application receives 608 the message. The promoted application sends 610 at least a portion of the encrypted message to the sign-in server for verification. For instance, the promoted application may send 610 the encrypted authentication code to the sign-in server for verification. The promoted application may also send an identifier associated with the promoting application and/or the promoted application.

The sign-in server receives 612 the message and/or the authentication code from the promoted application. The sign-in server decrypts 614 the message and/or the authentication code. The sign-in server confirms 616 whether the received authentication code is valid. In an embodiment, the sign-in server may confirm 616 whether the authentication code is valid by determining whether the authentication code was derived from a client private key that is associated with the private key of the sign-in server.

If the authentication code is valid, the sign-in server sends 618 a message to the promoted application that indicates the authentication code is valid. If the authentication code is not valid, the sign-in server sends 620 a message to the promoted application indicating that the authentication code is not valid and/or cannot be verified.

In response to receiving 622 a message indicating that the authentication code has been verified, the promoted application automatically signs 624 the user into the promoted application without prompting the user for, or requiring that the user provide the authentication code or any other form of second-factor authentication. For example, second-factor authentication may not be performed by actually requiring that a user enter a code that's visible to a user. Instead, second-factor authentication may be performed by offering a prompt in a trusted environment. For example, a user may be prompted to simply click "Yes", "Accept" or the like on a prompt in an application to confirm the user's sign in on another device, in another application, and/or the like.

In an embodiment, automatically signing a user into a promoted application may involve obtaining one or more access credentials that are not second-factor authentication credentials. Examples of access credentials may include, for example, a username, a password, one or more answers to one or more security questions, and/or the like. Obtaining one or more access credentials may involve prompting a user for one or more access credentials. For instance, a system may prompt a user to provide a username and/or password to access the promoted application. However, the user is not promoted to provide a 2FA code or any other second-factor authentication. As another example, obtaining one or more access credentials may involve accessing them from a secure storage location. As such, a user may not be required to type one or more access credentials.

Signing 624 a user into an application refers to granting a user access to content and/or functionality of an application. In certain embodiments, a promoted application may sign 624 a user into the promoted application without an Internet or other network connection. For instance, there may be certain content or functionality that a user can access without an Internet or other network connection. Full access may be granted when an Internet or network connection is established.

Figure 7:
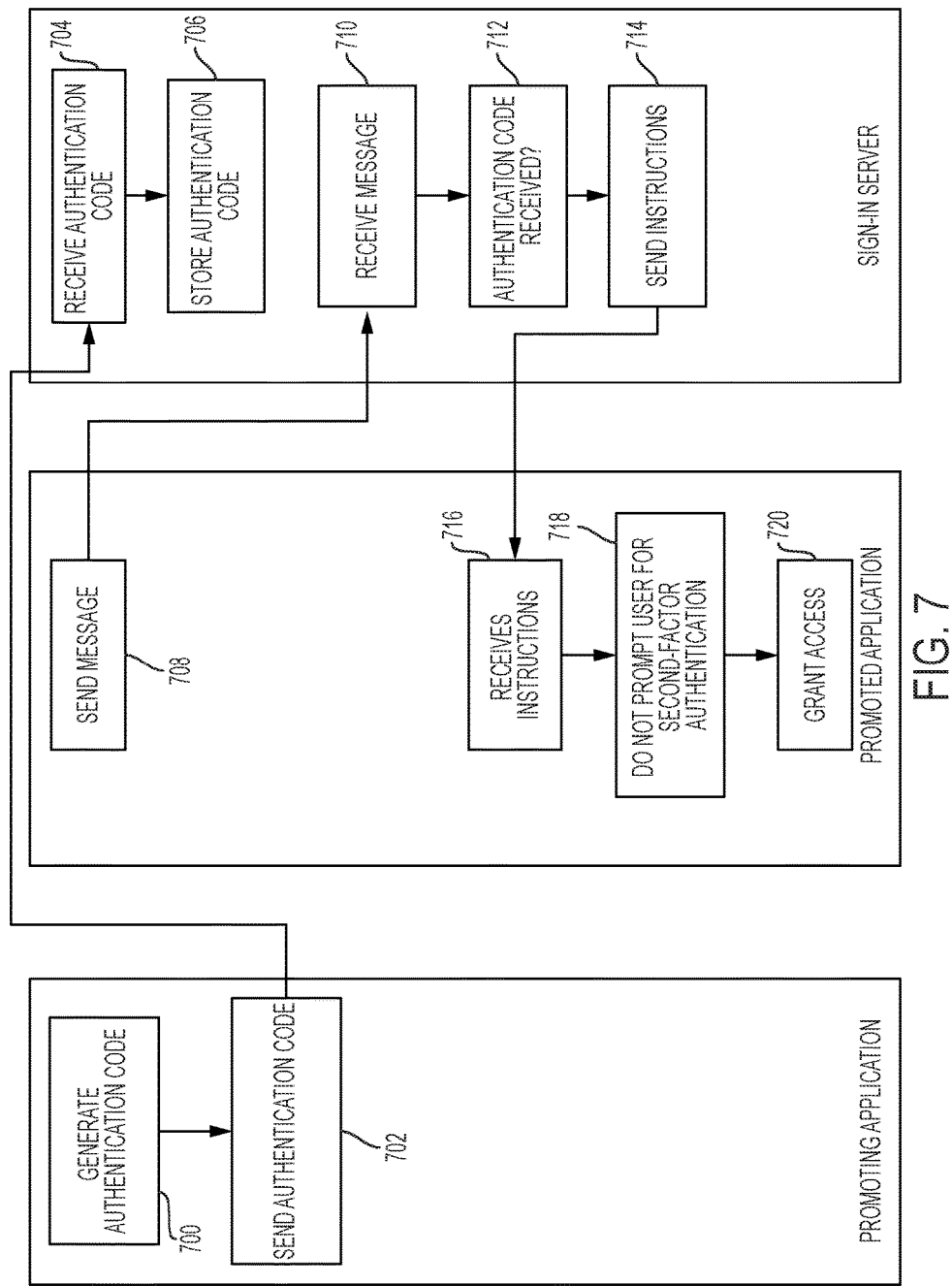

FIG. 7 illustrates another example method of launching 502 a promoted application according to an embodiment. As illustrated by FIG. 7, a promoting application may generate 700 an authentication code. The promoting application may generate 700 an authentication code using a private key associated with the promoting application. In this way, the authentication code can be verified to have originated with the promoting application. In various embodiment, the authentication code may be valid only for a limited amount of time. For instance, an authentication code may expire after a certain time. As another example, an authentication code may only be valid for a certain number of uses. As yet another example, an authentication code may only be valid for sign-on to a specific application.

The promoting application sends 702 the authentication code to a sign-in server. The sign-in server receives 704 the authentication code, and stores 706 the received authentication code in a data store. The sign-in server may store 706 the received authentication code so that it is associated with the promoting application and the promoted application. For instance, the promoting application may send the sign-in server an identifier associated with the promoting application, and an identifier associated with the instance of the promoted application. The sign-in server may store at least a portion of this information so that it is associated with the authentication code.

The promoted application sends 708 a message to the sign-in server to confirm sign-in. The message may include an identifier associated with the promoting application and/or the promoted application. The sign-in server receives 710 the message, and determines 712 whether it has already received an authentication code for the promoted application. For instance, the sign-in server may retrieve an identifier associated with the promoting application and/or the promoted application, and may use this information to search a data store for an authentication code associated with such information. In response to determining that it has already received an authentication code, the sign-in server sends 714 one or more instructions to the promoted application to not prompt a user for a second form of authentication. The promoted application receives 716 the instructions. In response, the promoted application does not prompt 718 a user for any form of second-factor authentication. The promoted application grants 720 the user access to at least a portion of the content, features or functionality of the promoted application.

In various embodiments, the promoted application may not generate an authentication code, but may provide the sign in server with an indication that the user has already issued a second-factor confirmation that is valid for sign-in into the promoted application. For example, two factor authentication may not involve a client-side-generated code at all, but rather the display of a 2FA prompt in a trusted environment. A 2FA prompt refers to a prompt that confirms sign in by a user in a different environment such as, for example, on a different device, in another application and/or the like. A trusted environment may be one where a user has provided one or more access credentials (or otherwise verified the user's identity) to access the environment. As such, a user may select "yes", "accept", "confirm" or the like on the 2FA prompt to confirm the user's sign in. For instance, a user may select "yes" on a 2FA prompt on a search application to confirm the user's sign-in to an email application.

The promoting application may generate a message that includes an indication that the user has affirmatively acknowledged the 2FA prompt. The promoting application may send the message to a sign-in server. In various embodiments, the promoting application may encrypt the message before sending to the sign-in server. This message may serve as an indication to the sign-in server not to ask for a second form of authentication in the promoted application. For instance, when contacted by the promoted application, the sign-in server may note that a 2FA has already been generated for this sign-in, and may instruct the promoted application not to prompt the user for a second form of authentication.

As mentioned above, a user confirmation to a 2FA prompt may be associated with one or more constraints. For example, a user confirmation may only be valid for a limited amount of time or a number of uses, only for sign-in from the promoted application identifier and not from any other application, only valid for sign-in using a specific primary credential (for example, only be valid for sign-in using a shared primary credential shared by all applications from that developer—typically stored in the device's "keychain" space, etc.).

Figure 8:
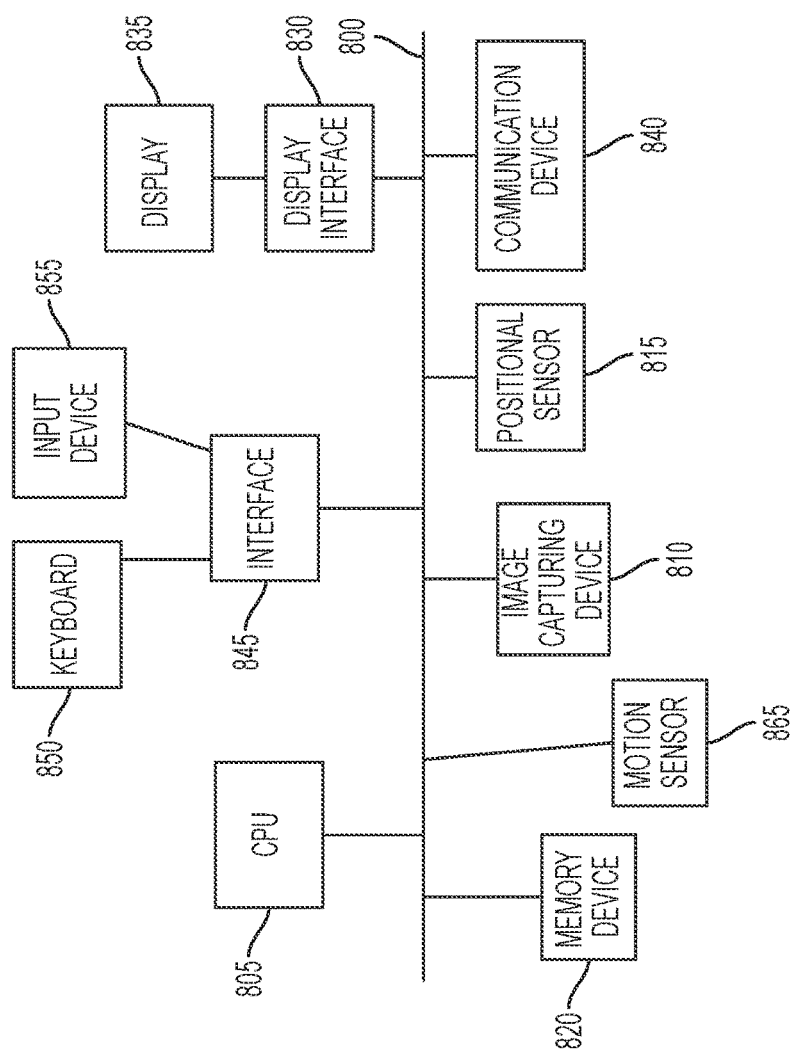
FIG. 8 illustrates a block diagram of example hardware that may be used to contain or implement program instructions according to an embodiment.

FIG. 8 depicts a block diagram of hardware that may be used to contain or implement program instructions, such as those of a hosted service, a monitoring service for a hosted service, an electronic device that is accessing a hosted service, or a virtual machine or container that serves in any of these roles. A bus 800 serves as an information highway interconnecting the other illustrated components of the hardware. The bus may be a physical connection between elements of the system, or a wired or wireless communication system via which various elements of the system share data. Processor 805 is a processing device of the system performing calculations and logic operations required to execute a program. Processor 805, alone or in conjunction with one or more of the other elements disclosed in FIG. 8, is an example of a processing device, computing device or processor as such terms are used within this disclosure. The processing device may be a physical processing device, a virtual device contained within another processing device, or a container included within a processing device.

A memory device 820 is a hardware element or segment of a hardware element on which programming instructions, data, or both may be stored. Read only memory (ROM) and random access memory (RAM) constitute examples of memory devices, along with cloud storage services.

An optional display interface 830 may permit information to be displayed on the display 835 in audio, visual, graphic or alphanumeric format. Communication with external devices may occur using various communication devices 840, such as a communication port or antenna. A communication device 840 may be communicatively connected to a communication network, such as the Internet or an intranet.

The hardware may also include a user input interface 845 which allows for receipt of data from input devices such as a keyboard or keypad 850, or other input device 855 such as a mouse, a touchpad, a touch screen, a remote control, a pointing device, a video input device and/or a microphone. Data also may be received from an image capturing device 810 such as a digital camera or video camera. A positional sensor 815 and/or motion sensor 865 may be included to detect position and movement of the device. Examples of motion sensors 870 include gyroscopes or accelerometers. Examples of positional sensors 815 such as a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method comprising:
   prompting, by a first application installed on a client electronic device, a user to install a second application on the client electronic device;
   prompting, by the first application, the user to authorize the first application to generate a two-factor authentication code for sign-in to the second application;
   in response to receiving an indication from the user to install the second application and receiving an indication from the user to authorize the first application to generate a two-factor authentication code:
   installing, on the client electronic device, the second application, and
   generating, by the first application, the two-factor authentication code;
   sending, by the first application, a message to the second application installed on the client electronic device, wherein the message comprises the two-factor authentication code;
   launching the second application installed on the client electronic device; and
   automatically signing the user into the second application using the two-factor authentication code without prompting, by the second application, the user to provide the two-factor authentication code.

2. The method of claim 1, wherein generating the two-factor authentication code comprises using a private key associated with the first application to generate the two-factor authentication code.

3. The method of claim 1, wherein sending the message to the second application comprises embedding the two-factor authentication code in the message.

4. The method of claim 3, wherein embedding the two-factor authentication code in the message comprises embedding the two-factor authentication code in a marketing tag of the message.

5. The method of claim 1, further comprising encrypting, by the first application, at least a portion of the message using a private key associated with the first application.

6. The method of claim 5, further comprising:
sending, by the second application, the at least a portion of the message to a sign-in server; and
receiving, by the second application, an indication from the sign-in server that the two-factor authentication code is valid.

7. The method of claim 1, wherein automatically signing the user into the second application comprises automatically signing the user into the second application in the absence of an Internet connection.

8. The method of claim 1, further comprising obtaining one or more access credentials associated with the user to access the second application, wherein the one or more access credentials do not comprise the two-factor authentication code.

9. The method of claim 1, wherein the two-factor authentication code further comprises dynamic data associated with a clock or a counter of the client electronic device.

10. A method comprising:
receiving, by one or more servers from a first application on a client electronic device, a two-factor authentication code for a user to sign-in to a second application on the client electronic device;
receiving, by the one or more servers from the second application, a message indicating that the user confirms sign-in to the second application;
determining, by the one or more servers, that the two-factor authentication code received from the first application is valid; and
sending, by the one or more servers to the second application, one or more instructions not to prompt the user for the two-factor authentication code.

11. The method of claim 10, wherein the two-factor authentication code is associated with one or more of:
a time period during which the two-factor authentication code is valid;
a number of uses for which the two-factor authentication code is valid; or
an identifier of the second application for which the two-factor authentication code is valid.

12. A system comprising:
a client electronic device, wherein a first application is installed on the client electronic device;
a computer-readable storage medium comprising one or more programming instructions that, when executed, cause the client electronic device to:
prompt a user to install a second application on the client electronic device,
prompt the user to authorize the first application to generate a two-factor authentication code for sign-in to the second application,
in response to receiving an indication from the user to install the second application and receiving an indication from the user to authorize the first application to generate the two-factor authentication code:
install the second application, and
generate the two-factor authentication code via the first application,
send a message via the first application to the second application, wherein the message comprises the two-factor authentication code,
launch the second application, and
automatically sign the user into the second application using the two-factor authentication code without prompting, by the second application, the user to provide the two-factor authentication code.

13. The system of claim 12, wherein the one or more programming instructions that, when executed, cause the first application to generate the two-factor authentication code comprise one or more programming instructions that, when executed, cause the first application to use a private key associated with the first application to generate the two-factor authentication code.

14. The system of claim 12, wherein the one or more programming instructions that, when executed, cause the first application to send the message to the second application comprise one or more programming instructions that, when executed, cause the first application to embed the two-factor authentication code in the message.

15. The system of claim 14, wherein the one or more programming instructions that, when executed, cause the first application to embed the two-factor authentication code in the message comprise one or more programming instructions that, when executed, cause the first application to embed the two-factor authentication code in a marketing tag of the message.

16. The system of claim 12, wherein the computer-readable storage medium further comprises one or more programming instructions that, when executed, cause the first application to encrypt at least a portion of the message using a private key associated with the first application.

17. The system of claim 16, wherein the computer-readable storage medium further comprises one or more programming instructions that, when executed, cause the second application is configured to:
send the at least a portion of the message to a sign-in server; and
receive an indication from the sign-in server that the two-factor authentication code is valid.

18. The system of claim 12, wherein the two-factor authentication code further comprises dynamic data associated with a clock or a counter of the client electronic device.

19. A system comprising:
one or more servers, the one or more servers configured to:
receive from a first application on a client electronic device, a two-factor authentication code for a user to sign-in to a second application:
receive, from the second application, a message indicating that the user confirms sign-in to the second application;
determine that the two-factor authentication code received from the first application is valid; and
send, to the second application, one or more instructions not to prompt the user for the two-factor authentication code.

20. The system of claim 19, wherein the two-factor authentication code is associated with one or more of:
a time period during which the two-factor authentication code is valid;
a number of uses for which the two-factor authentication code is valid; or
an identifier of the second application for which the two-factor authentication code is valid.

* * * * *